O. UNTERLOFF.
MILLING CUTTER.
APPLICATION FILED MAR. 2, 1911.
1,019,564.
Patented Mar. 5, 1912.
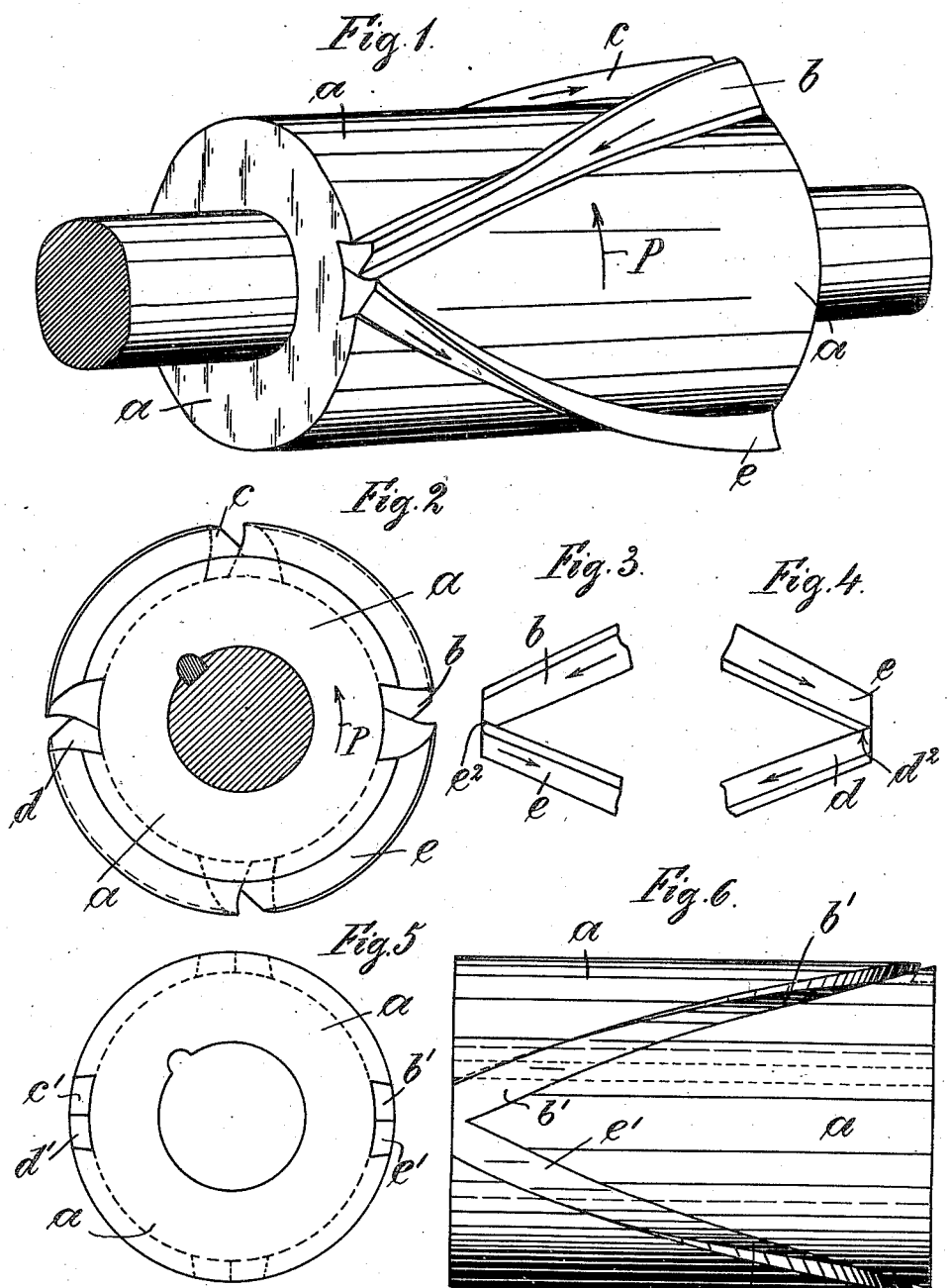
Witnesses:
Marie A. Braun
Emma A. McGarrick
Inventor:
Otto Unterloff
by L. K. Böhm
Attorney

UNITED STATES PATENT OFFICE.

OTTO UNTERLOFF, OF OBERSCHÖNEWEIDE, GERMANY, ASSIGNOR TO STAHLWERK BECKER AKTIEN-GESELLSCHAFT, OF WILLICH, CREFELD, GERMANY.

MILLING-CUTTER.

1,019,564.  Specification of Letters Patent.  Patented Mar. 5, 1912.

Application filed March 2, 1911. Serial No. 611,787.

*To all whom it may concern:*

Be it known that I, OTTO UNTERLOFF, a subject of the King of Prussia, and resident of Oberschöneweide, Germany, engineer, have invented new and useful Improvements in Milling-Cutters, of which the following is a specification.

This invention relates to cylindrical milling-cutters of the type in which alternately right and left handed helical cutters are inserted in grooves in a cylindrical body part.

Hitherto, in order to minimize the cost of producing cylindrical milling-cutters from high speed tool steel, it has been usual to insert cutters of partly straight and partly helical form and to secure them in position by means of retaining screws, studs or the like. This method of securing the cutters has been necessary owing to the fact that the cutters are arranged at an inclination to the axis of the cylinder and therefore are liable to be loosened during the working of the cutter and tend to slide or be pushed out of the grooves.

According to the present invention the cutters are so arranged as to be self-securing against any lateral sliding movement, thereby dispensing with the necessity for retaining screws or the like. In order to prevent radial displacement of the cutters the latter are inserted in undercut grooves in the known manner.

In order that the invention may be more clearly understood reference is made to the accompanying drawings, which show by way of example the preferred method of carrying out the invention.

Figure 1 is a perspective view of a cylindrical milling cutter; Fig. 2 is an end view of the milling cutter shown in Fig. 1. Figs. 3 and 4 are detail views showing to an enlarged scale the meeting ends of the individual cutters. Fig. 5 is an end view of the cylindrical body part without the cutters, and Fig. 6 is a side view of Fig. 5.

Referring to the drawings: $a$ is the cylindrical body part having a series of undercut grooves $b'$, $c'$ $d'$ and $e'$ in which are inserted the cutters $b$ $c$ $d$ and $e$ respectively (four cutters being shown on the drawings). The grooves are so arranged as to run into one another at the ends of the cylindrical body part as is clearly to be seen in Fig. 6, and in order that the cutters may be inserted in correct position in the grooves, it is necessary that one end of each cutter be beveled to correspond to the intersection of the grooves. As will be seen on reference to Fig. 3 the end of the cutter $e$ is cut away at $e^2$, so that the cutter $b$ bears against the beveled face $e^2$ thus formed on the cutter $e$. The other end of the cutter $e$ as shown at Fig. 4, bears against a beveled face $d^2$ formed on the adjacent cutter $d$ and in this manner it will be seen that the cutters mutually maintain one another in position.

It will of course be readily understood that the beveled face is formed on that end of the cutter which tends to be forced out during the working of the milling cutter, that is to say, the end to which lateral movement of the cutter is directed and by this means any lateral movement is prevented by the beveled face bearing against the end of the adjacent cutter.

It will be seen that when the milling cutter is rotated in the direction of the arrow P, Figs. 1 and 2, the milling pressure acts in the direction of the arrows upon the cutters $b$ $c$ $d$ and $e$, the cutters mutually preventing any lateral movement. The cutters are thus retained in position in the simplest possible manner.

The number of pairs of cutters carried by the cylindrical body parts depends of course upon the circumference and length of the latter and also upon the helical pitch of the cutters.

I claim:

1. A milling cutter comprising, in combination, a cylindrical body part having grooves therein, alternately right and left handed helical cutters inserted in said grooves in such a manner that each cutter bears at the end which tends to be forced out during the working of the milling cutter against the end of the adjacent cutter.

2. A milling cutter comprising, in combination, a cylindrical body part having undercut grooves in the periphery thereof, alternately right and left handed helical cutters inserted in said grooves and a beveled face on one end of each cutter, said beveled face bearing against the end of the adjacent cutter.

3. A milling cutter comprising, in combination, a cylindrical body part and a plurality of helical cutters inserted in grooves in the periphery of said body part, each groove being inclined to the adjacent groove and being arranged longitudinally of the body part and at an inclination to the axis thereof, so that the meeting ends of adjacent grooves intersect one another at the ends of the body part in such a manner that each cutter bears at the end which tends to be forced out during the working of the milling cutter against the end of the adjacent cutter.

4. A milling cutter comprising, in combination, a cylindrical body part having undercut grooves in the periphery thereof, each groove being inclined to the adjacent groove and being arranged longitudinally of the body part and at an inclination to the axis thereof so that the meeting ends of adjacent grooves intersect one another at the ends of the body part, alternately right and left handed helical cutters inserted in said grooves and a beveled face on one end of each cutter, said beveled face bearing against the end of the adjacent cutter.

In witness whereof I have hereunto set my hand in the presence of two witnesses.

OTTO UNTERLOFF.

Witnesses:
 HANS RICHTER,
 WOLDEMAR HAUPT.